(12) United States Patent
Hulls

(10) Patent No.: US 8,451,983 B2
(45) Date of Patent: *May 28, 2013

(54) DYNAMIC EMERGENCY DISASTER PLAN

(75) Inventor: Christopher R Hulls, Point Reyes, CA (US)

(73) Assignee: LReady, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/214,181

(22) Filed: Aug. 20, 2011

(65) Prior Publication Data

US 2011/0299666 A1 Dec. 8, 2011

Related U.S. Application Data

(63) Continuation of application No. 11/623,936, filed on Jan. 17, 2007, now Pat. No. 8,023,621.

(60) Provisional application No. 60/759,641, filed on Jan. 17, 2006.

(51) Int. Cl.
*H04M 11/04* (2006.01)
*G06Q 10/00* (2006.01)
*G08B 25/14* (2006.01)

(52) U.S. Cl.
CPC .............. *H04M 11/04* (2013.01); *G06Q 10/00* (2013.01); *G08B 25/14* (2013.01); *H04Q 7/22* (2013.01)
USPC .............. 379/37; 210/652; 340/8.1; 340/506; 340/525; 342/357.31; 379/45; 434/238; 455/404.1; 455/432.3; 455/461; 705/7.13; 705/35; 705/324; 709/200; 725/33; 725/109

(58) Field of Classification Search
CPC .................................................... H04M 11/04
USPC .............. 340/506, 8.1, 525; 342/357.31; 379/37, 45; 434/238; 455/404.1, 461, 432.3; 709/200; 725/33, 109; 210/652; 705/7.13, 705/35, 324; 718/104
See application file for complete search history.

(56) References Cited

U.S. PATENT DOCUMENTS

| | | | |
|---|---|---|---|
| 5,414,408 A * | 5/1995 | Berra | 340/525 |
| 5,805,670 A | 9/1998 | Pons et al. | |
| 6,295,346 B1 | 9/2001 | Markowitz | |
| 6,347,384 B1 | 2/2002 | Satomi | |
| 6,567,502 B2 | 5/2003 | Zellner et al. | |
| 6,600,812 B1 | 7/2003 | Gentillin et al. | |
| 6,724,861 B2 | 4/2004 | Newland et al. | |
| 6,792,081 B1 * | 9/2004 | Contractor | 379/45 |
| 6,809,642 B1 * | 10/2004 | Brenner | 340/506 |
| 6,816,878 B1 * | 11/2004 | Zimmers et al. | 709/200 |
| 7,016,477 B2 | 3/2006 | Contractor | |
| 7,046,986 B2 * | 5/2006 | Amano et al. | 455/404.1 |
| 7,215,282 B2 * | 5/2007 | Boling et al. | 342/357.31 |
| 7,573,983 B2 * | 8/2009 | Takahashi et al. | 379/45 |

(Continued)

*Primary Examiner* — Gerald Gauthier
(74) *Attorney, Agent, or Firm* — Steven A. Nielsen; Allman & Nielsen, P.C.

(57) ABSTRACT

A database and communications server allow for composure of an emergency disaster plan that is tailored to the demographic and geographic information provided by a subscriber to the disclosed system. In the event of an emergency, relevant portions of a family disaster plan are communicated to a subscriber and the family members of the subscriber. Each subscribing family member may communicate with the database, which in turn automatically distributes the message to all family members. After the disaster has ended, insurance information is relayed to the subscriber, and the subscriber's insurance companies are notified.

9 Claims, 3 Drawing Sheets

U.S. PATENT DOCUMENTS

| | | |
|---|---|---|
| 8,023,621 B2 * | 9/2011 | Hulls ............................... 379/37 |
| 2002/0039405 A1 | 4/2002 | Newland |
| 2002/0068587 A1 * | 6/2002 | Chapman ....................... 455/461 |
| 2002/0116242 A1 * | 8/2002 | Vercellone et al. ................. 705/7 |
| 2003/0059751 A1 * | 3/2003 | Welles ........................... 434/238 |
| 2003/0125998 A1 * | 7/2003 | McKenney et al. ................ 705/7 |
| 2003/0169853 A1 * | 9/2003 | Moses ............................. 379/37 |
| 2004/0103431 A1 * | 5/2004 | Davenport et al. .............. 725/33 |
| 2005/0086227 A1 * | 4/2005 | Sullivan et al. ................... 707/7 |
| 2006/0109113 A1 | 5/2006 | Reyes |
| 2006/0113251 A1 * | 6/2006 | McGuire et al. ............. 210/652 |
| 2006/0133582 A1 * | 6/2006 | McCulloch ..................... 379/45 |
| 2006/0212452 A1 * | 9/2006 | Cornacchia ....................... 707/10 |
| 2006/0250271 A1 * | 11/2006 | Zimmerman ............ 340/825.36 |
| 2007/0015506 A1 * | 1/2007 | Hewett et al. ............... 455/432.3 |
| 2007/0094670 A1 * | 4/2007 | Graves ........................... 718/104 |
| 2007/0165789 A1 * | 7/2007 | Hulls ............................... 379/37 |
| 2008/0215626 A1 * | 9/2008 | Gomez ....................... 707/104.1 |
| 2009/0245477 A1 * | 10/2009 | Ger et al. ......................... 379/37 |
| 2010/0135471 A2 * | 6/2010 | Hulls ............................... 379/37 |
| 2011/0299666 A1 * | 12/2011 | Hulls ............................... 379/37 |

* cited by examiner

DYNAMIC EMERGENCY DISASTER PLAN

CROSS-REFERENCE TO RELATED APPLICATIONS

This application is a continuation of pending application Ser. No. 11/623,936 filed on Jan. 17, 2007 which claims benefit of U.S. provisional patent application 60/759,641 filed on Jan. 17, 2006, entitled "Dynamic Family Disaster Plan" the contents of which are incorporated herein by reference.

STATEMENT REGARDING FEDERALLY SPONSORED RESEARCH OR DEVELOPMENT

Not Applicable

REFERENCE TO A SEQUENCE LISTING

Not Applicable

BACKGROUND OF THE INVENTION (1) Field of the Invention

The invention relates to means and methods of creating and using a family disaster plan implemented by electronic means and capable of automatically contacting subscribers. User geographic and demographic information is used to generate templates to assist in drafting the family disaster plan. A database or server generates relevant information in the planning stage and generates dynamic communications during and after an emergency.

(2) Description of the Related Art

Several attempts to provide emergency notification are known in the related art. However, the related art fails to provide the advantages of the present invention.

A Family Disaster Plan or ("FDP") is a document that is traditionally created by a family to memorialize agreed upon actions to be executed in the event of a contemplated disaster or emergency. Various disaster support agencies encourage the creation and use of FDPs as means of preparing for and surviving a disaster. While a traditional FDP in the related art may include meeting instructions, directions to supplies, contact numbers, and other emergency related guidelines, FDPs are very limited in their real world utility:

FDPs are static documents. An entire family needs to memorize and actively update the FDP as family conditions and/or family members change.

FDPs rely upon family members to undertake many tasks that are impossible to accomplish in a disaster situation.

FDPs are not easily accessible by rescue, fire, medical, or law enforcement authorities wishing to assist families in need.

FDPs do not change dynamically as a disaster progresses.

In addition to traditional FDPs, the related art includes various means of generating various alarms to members of the public or to members subscribing to a warning system.

U.S. patent application 20060109113 by Reyes discloses an alarm system for use in predetermined buildings or facilities. Reyes does not provide notifications to people who may be located in unknown areas.

U.S. patent application 2002/0039405 by Newland provides general alarms and general notifications to subscribers, but fails to provide individualized information particular to each user. Newland acts as an electronic alarm bell, and fails to allow individuals to communicate information to their friends or family members.

U.S. Pat. No. 6,347,384 by Satomi discloses means of replacing computer and network equipment in the event of a disaster and discloses means of facilitating a disaster plan for a geographic location. Satomi fails to assist individuals in creating disaster plans and fails to communicate individualized messages to disaster victims or their families.

U.S. Pat. No. 7,016,477 to Contractor provides means of delivering a message from one subscriber to another. Contractor provides a system that leaves recorded messages in the event a subscriber is not home. Contractor fails to provide means to subscribers to coordinate their emergency plans and fails to provide individualized information to disaster victims.

U.S. Pat. No. 6,295,346 to Markowitz discloses an electronic phone tree that is activated by a subscriber to summon help and to send a pre-defined messages to friends and family. Markowitz fails to provide disaster victims means of updating their family members as to their status and location.

Thus, there is room in the art for means and methods of facilitating and executing family disaster planning and implementing dynamic communications between family members during and after a disaster.

BRIEF SUMMARY OF THE INVENTION

The present invention overcomes shortfalls in the related art by providing means and methods for families, groups and individuals to prepare dynamic emergency plans, obtain information regarding locally available resources, obtain emergency supplies, and during a disaster have two-way communications in multiple formats.

Before a Disaster

The disclosed system allows an individual group or family to enter individualized information into a database through the use of templates that vary depending upon user input. Person(s) using the disclosed system are sometimes called "subscribers". A family initially enters their home location, which may prompt questions or the disclosure of information particular to a geographic location. For example, a family listing a home location on the San Andreas Fault line in California will be given templates and resources relevant to earthquakes.

Each family or subscriber to the disclosed system enters various meeting points which may be dependant upon the type of disaster. For example, in case of a tsunami, a family may agree to meet at a location miles away on high ground; in case of a home fire, a family may agree to meet at a local diner. Each family member may enter their cell, work, home, and fax numbers in addition to their text and email addresses as well as any other means of contact.

As a family enters their information into the database, local resource information is disclosed and suggestions are issued depending upon with the demographics of the family. For example, a family with young children will be given questionnaire templates to solicit information needed to deal with a missing child disaster. A family with young children may also be given child safety information as well as geographic child safety information such as the location of nearby bodies of water, mental institutions or registered sex offenders.

During a Disaster

The invention contemplates many types and magnitudes of disasters. Messages may be issued by family members, operators of the disclosed system, or governmental agencies and targeted to particular families, locations or by other attributes. For example, a flood warning may trigger an alarm to subscribers living or working in the relevant flood area. Warnings or messages from the disclosed system may take the form of a phone call, email, text message, fax or other medium. The invention contemplates the use of changing or dynamic messages that vary depending upon the type and magnitude of the disaster, the pre-defined data of the subscribing family, the actions of the subscribers and the evolving condition of the disaster.

For example, during a tsunami warning, a father may remove his children from the beach and drive to a pre-determined relative's home located on higher ground miles from the beach. The database would generate a text message and cell phone call instructing the father to travel to the home of the out of town relative. Thus, the distressed father does not subject his children to a "senior moment" where he forgets the pre-determined family plan for floods.

While driving to the pre-determined meeting spot, the father may call into the system and give word as to his whereabouts and status. The system in turn forwards the voice message to other family members. The other family members may respond to the message. While in traffic, the father may call into the database and retrieve any messages. The disclose system contemplates the use of voice dictation software and other means suitable for converting voice messages to text messages and visa versa. All members of a family will receive all messages from all other members of the family via all practical communication channels.

Should the status of the disaster change, the system may send new messages to all relevant subscribers. The revised messages will take into account the changed circumstances of the perceived or feared disaster as well as the circumstances of the subscribing family.

After a Disaster

The dynamic nature of the invention continues to benefit a subscribing family after the disaster has subsided. For example, the database may transmit insurance information to a subscribing family and contact the relevant insurance companies with the current contact information of the relocated family. The invention may also contact extended family and distant friends to alleviate stress and to coordinate further assistance to the subscribing family.

These and other benefits of the invention will be made apparent with considering the specification when taken in conjunction with the drawings.

DETAILED DESCRIPTION OF THE INVENTION

Initial Set Up

Figure 1:
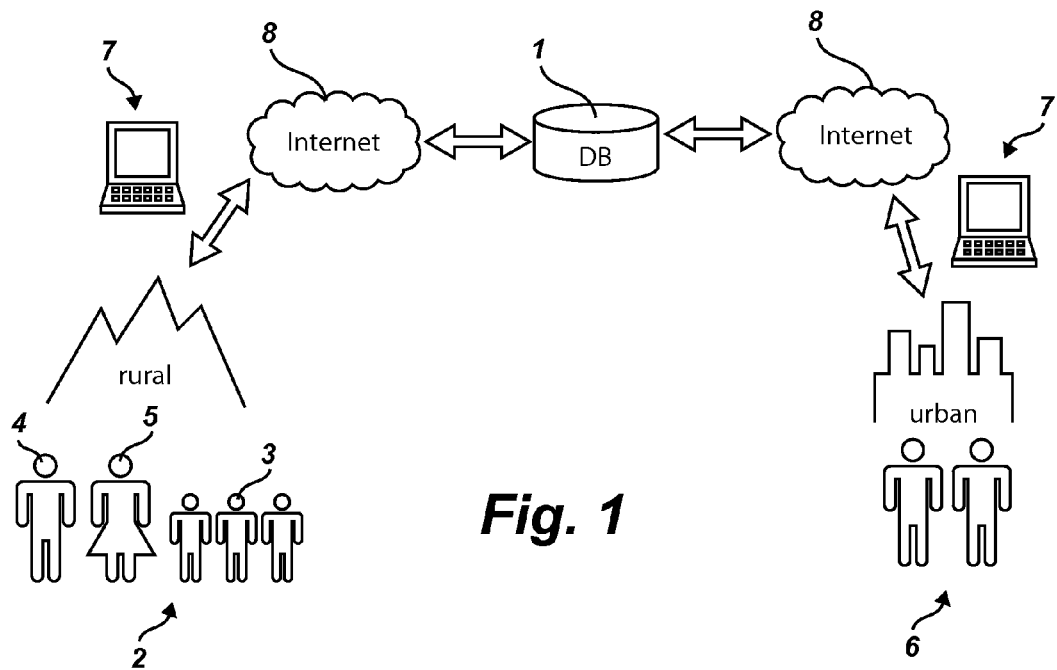
FIG. 1 is a block diagram of two subscribing families entering individualized data into the database.

Conceptually, creation of the invention starts with an online database 1 with means to communicate with a subscribing family. FIG. 1 shows two separate subscribing families entering data into the database 1. By way of example, the family living in rural area or the "rural family" 2 has three children 3, a father 5 and working mother 6. As the rural family 2 enters their demographic and geographic information, templates regarding rural and child risks and resources are presented to the rural family.

The urban family 6 is also shown entering data into the database 1. The urban family 6 lives in an urban area with no children and will thus be presented with a different set of templates as compared to the rural family 2. In the preferred embodiment, a subscribing family may enter data into the database 1 through a home computer 7 connected to the Internet 8 which in turn is connected to the database 1. But, other embodiments are contemplated wherein a subscriber could send information to the database via PDA, fax, regular mail or other means.

In addition to entering demographic and geographic information, a subscribing family may input actions and data for differing disasters. For example in case of a flash flood or tsunami warning a subscribing family may instruct the invention to notify a relative living on high ground 9 and to send instructions to all family members to travel to the high ground home 9 of the relative.

Many other contingencies may be addressed and incorporated into the invention. For example, children may be issued identification bracelets containing a phone number and a unique identification number. In the event a child is lost, the child or a bystander may call the number and convey the identification number. Such calls placed to the disclosed system would trigger various pre-defined actions, such as notification of the caregivers of the child, and if appropriate, notification to authorities to stop their search for the missing child.

In the case of a missing child, the disclosed system may also search the database 1 to see if the missing child is a user of a GPS locator, and contact the GPS service provider to obtain the coordinates of the missing child. Adults with diminished capacities may also benefit from the features offered for the missing child disaster.

The disclosed system may also be used to aid in the notification and recovery process after a tragedy such as a car accident. If there is a death or serious injury to a subscribing member, emergency personnel could activate the disclosed system by calling a number or going to a website listed on a card, bracelet, or other identification device worn or carried by the subscribing victim. The disclosed system would then either automatically or with the assistance of an operator, carry out a predefined list of calls, emails or other communiqués that were in accordance with the victim's desires. This would speed the notification process significantly and also ensure that the proper support is in place to ease the pain for subscribing family. When appropriate, the disclosed system could give emergency personnel specific directions to contact a member of the clergy to contact the family instead of law enforcement officials. This could help ease the shock experienced after a traumatic event.

The data to be entered by subscribers includes medical, insurance, driver's license information and other information that will be useful in case of a major disaster where a subscriber's home and/or personal records are lost. During the initial data entry process, a subscriber may select from various service features within the database 1, such as automation features, live operator assistance, and disaster benefits. This way the system will react in accordance with preferences of the subscriber. The subscriber then needs do nothing else, except update the system as his or her situation changes.

Figure 2:
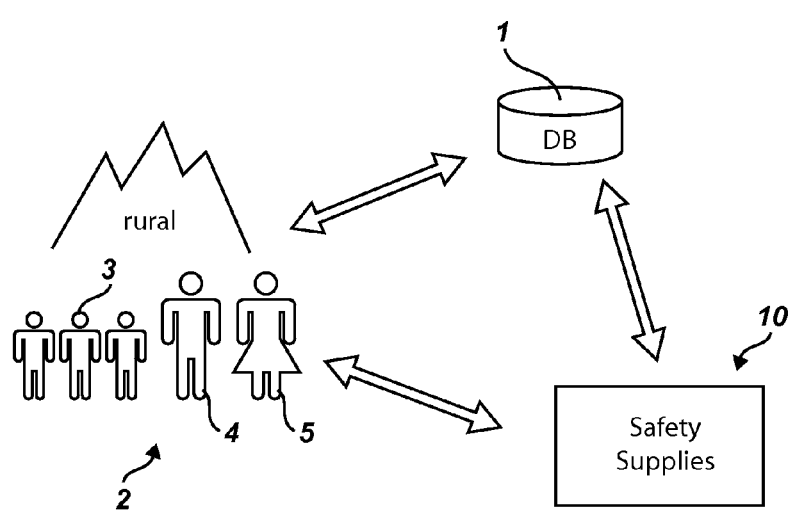
FIG. 2 is a block diagram of the database interacting with a subscribing family and a warehouse of safety supplies.
Figure 3:
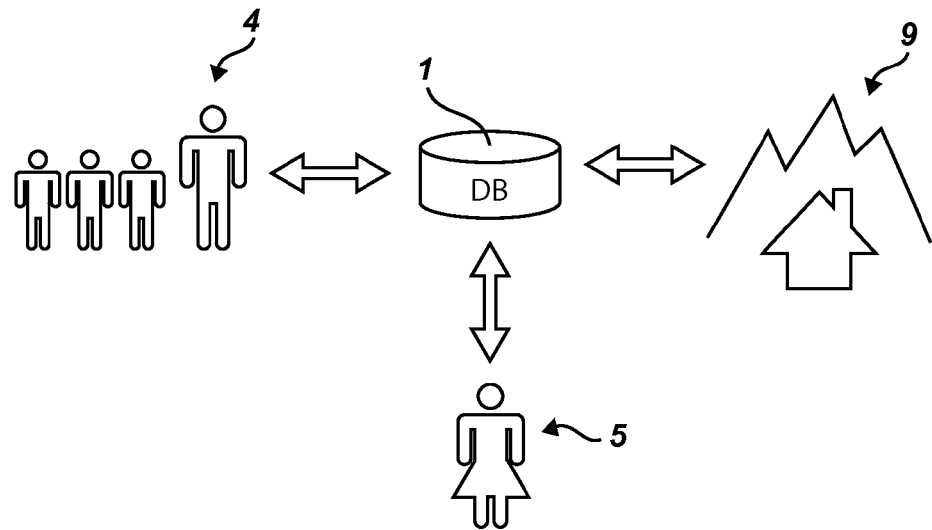
FIG. 3 is a block diagram of the invention contacting a subscribing family and a relative of the subscribing family.

In order to better prepare the subscribers for a disaster and to add to the profitability of the system, safety supplies 10 may be offered for sale to the subscriber as shown in FIG. 2. The offered safety supplies would correspond to the needs of the subscriber.

Activation of the System or the Issuance of a Warning

A warning from the invention or disclosed system may be activated by a subscriber, emergency personnel, or operators of the system. Warnings may be directed to one or more subscribers and tailored to the demographic and geographic characteristics of the subscribers. Appropriate warnings could be automatically activated by events such as the activation of the emergency broadcast system or the declaration of a disaster by a governmental entity or any other prescribed event.

In the event of an emergency, the system may be activated in a multitude of manners. For personal disasters or emergencies, the primary method of activation would be by the subscriber who accesses the database via phone, Internet, or other communications device. The subscriber either communicates with a live operator or interacts with an automated system to activate his or her pre-determined plan.

Outside agencies can also activate the system. For example, if there is a tsunami warning, an operator of the disclosed system could enter the zip codes of the affected areas, which could then trigger a tsunami warning for all subscribers within the affected areas. The system could then automatically contact all appropriate subscribers through a variety of means to alert them of the situation.

Features of the System During a Disaster

Once the system is activated, it may undertake the prescribed actions automatically via a computer controller included with the database, which could completely handle all aspects of the plan, or when necessary, transfer certain tasks to a human operator.

FIG. 2 shows an example of the system in action during a flood or tsunami disaster where the dad 4 of the rural family 2 is with his children 3 at a beach. The system is activated and sends a message to the dad. The message may take the form of a beeper message, cell phone message, text message or other means. The working mom 5 is contacted by the system as is the out of town relative living on high ground 9.

Figure 4:
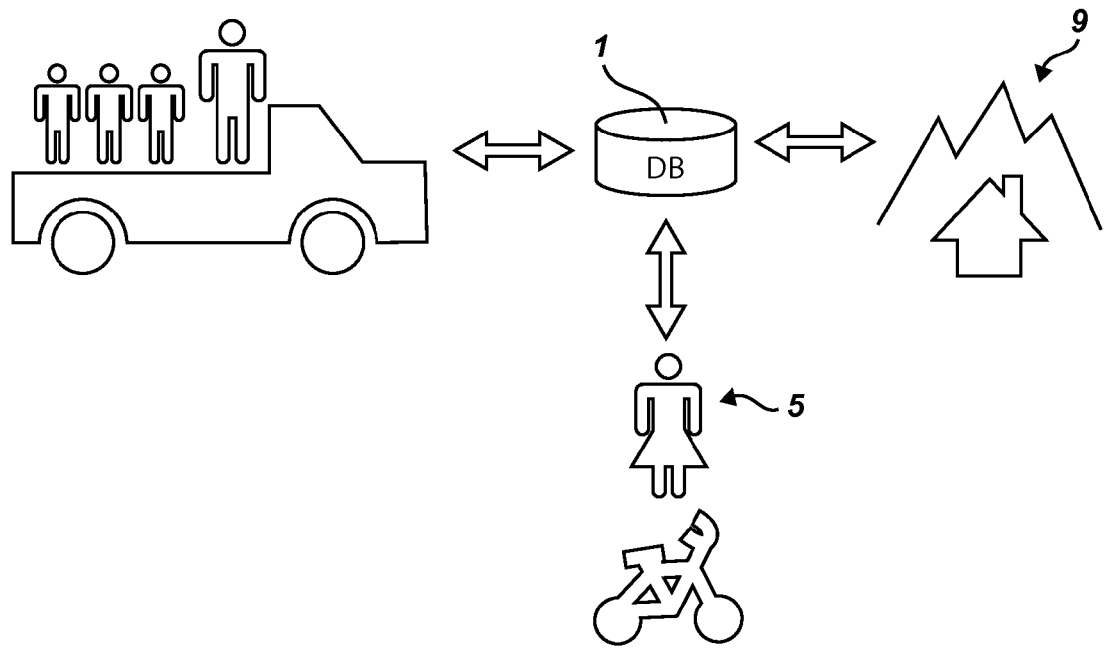
FIG. 4 is a block diagram of a subscribing family sending and receiving status updates.

FIG. 4. shows the dad calling the system with a message to be delivered to the mom and relative living on high ground. The dad may report that he is safely on the road driving to the relative's high ground home. The database sends the message to mom and out of town relative living on high ground. Due to the dad's need to stay focused on his driving, the system provides a great benefit in minimizing the dad's phone calls.

Features of the System after a Disaster

Figure 5:
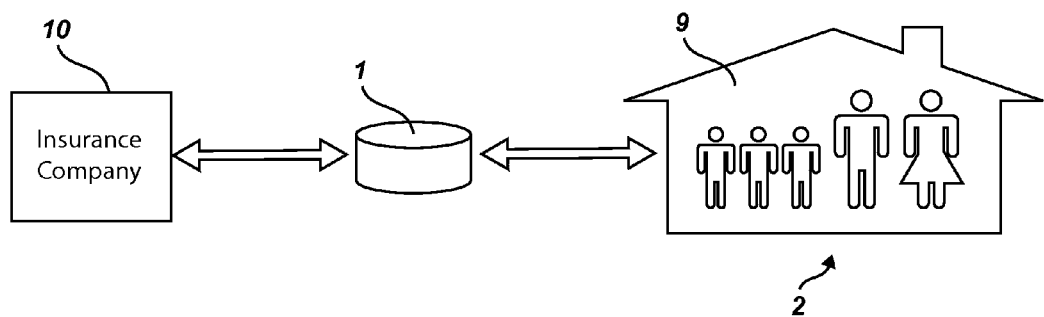
FIG. 5 is a block diagram of the invention providing insurance information to a subscribing family and contacting the subscribing family's insurance company.

FIG. 5 shows the system informing the subscribing family's insurance company 10 of the plight of the subscribing family. In this example, the rural family 2 is safe at the high ground home 9 and receiving their pre-stored insurance information along with any messages issued by their insurance company.

Figure 6:
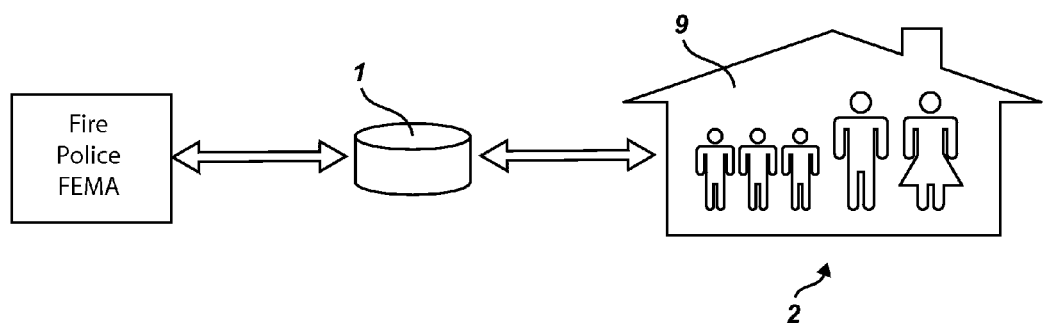
FIG. 6 is a block diagram demonstrating communication between Fire, Police and FEMA with the invention and a subscribing family.

FIG. 6 shows fire, police, and FEMA personnel interacting with the system to ascertain the whereabouts and needs of the rural family. In this example, valuable resources are conserved as the rural family is safe and sound in their relatives high ground home. Authorities are thus able to focus their attention to others who are in need of assistance.

Items

Embodiments of the invention include, but are not limited to the following items:

1. A family disaster planning system comprising:
means of recording user input into a database;
means of contacting subscribers;
means of allowing subscribers to communicate with the database during a disaster.

2. The system of item 1 comprising means of recording user input through the use of templates.

3. The system of item 2 wherein the templates displayed depend upon the geographic information entered by the subscriber 4. The system of item 2 wherein the templates displayed depend upon the demographic information entered by the subscriber.

5. The system of item 1 comprising means of notifying subscribers on the basis of subscriber location.

6. The system of item 1 comprising means of allowing subscribers to obtain updated messages from family members during an emergency.

7. The system of item 1 comprising means of providing subscribers with pre-determined information after an emergency.

8. The system of item 1 comprising means of allowing third parties to access the data to provide individual assistance to subscribers.

9. A method of preparing and implementing a family disaster plan comprising:
collecting information from subscribers;
storing information from subscribers;
allowing subscribers to access their information during an emergency;
providing subscribers with relevant portions of their family disaster plan during an emergency; and
collecting information from subscribers during an emergency and distributing the information to family members during an emergency.

10. The method of item 9 including distributing insurance information to subscribers after an emergency.

11. The method of item 9 including contacting the insurance companies of a subscriber after an emergency.

What is claimed is:

1. An emergency planning system, the system comprising:
a) means of recording user input into a database, wherein the user input includes user location, user demographics and user contact information;
b) means of formulating and presenting user specific questions based upon user location and user demographics;
c) means of recording disaster information, with disaster information comprising disaster location and evolving disaster data;
c) means of creating user specific information based upon disaster location, user demographics, and user location;
d) means of creating changing messages to users, with the messages changing in response to the entry of evolving disaster data; and
e) means of distributing changing messages to selected users, the users being selected on the basis of user location and user demographics.

2. The emergency planning system of claim 1 further comprising means of presenting templates to users with the contents of the templates being derived from the geographic data entered by a user.

3. The emergency planning system of claim 2 further comprising means of ascertaining the location of a user.

4. A method of preparing and implementing an emergency plan, the method comprising:
- a) collecting information from subscribers, the information comprising subscriber location, subscriber demographics and subscriber contact information;
- b) creating and presenting to subscribers subscriber specific questions based upon subscriber location and subscriber demographics;
- c) recording information regarding disasters, with the information regarding disasters comprising disaster location and evolving disaster data; and
- d) creating messages for each subscriber, with each message based upon subscriber location, subscriber demographics and evolving disaster data.

5. The method of claim 4 further comprising the step of transmitting messages to subscribers.

6. The method of claim 5 further comprising the step of presenting templates to subscribers for the collection of subscriber information with the contents of the templates derived from information previously entered by subscribers.

7. A method of preparing and implementing an emergency plan, the method comprising:
- a) collecting geographic information from subscribers;
- b) creating templates with questions, with the questions of the templates derived from geographic information obtained from subscribers;
- c) collecting additional information as subscribers respond to the questions of the templates;
- d) storing information collected from subscribers;
- e) allowing subscribers to access subscriber information during an emergency;
- f) providing subscribers with subscriber information during an emergency; and
- g) providing information to subscriber family members during an emergency.

8. The method of claim 7 further comprising the step of ascertaining if a subscriber is using a Global Positioning Satellite (GPS) enabled device and obtaining the location of a subscriber from a subscriber's GPS enabled device.

9. The method of claim 8 further comprising the step of sending messages to subscribers, based upon a subscriber's GPS determined location.

\* \* \* \* \*